(12) United States Patent
Tanaka et al.

(10) Patent No.: US 9,225,908 B2
(45) Date of Patent: Dec. 29, 2015

(54) IMAGING APPARATUS

(71) Applicant: OLYMPUS CORPORATION, Tokyo (JP)

(72) Inventors: Yoshinobu Tanaka, Tokyo (JP); Takashi Yanada, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 134 days.

(21) Appl. No.: 14/051,008

(22) Filed: Oct. 10, 2013

(65) Prior Publication Data
US 2014/0104460 A1  Apr. 17, 2014

(30) Foreign Application Priority Data

Oct. 12, 2012 (JP) ................... 2012-227017

(51) Int. Cl.
*H04N 5/232* (2006.01)

(52) U.S. Cl.
CPC ....... *H04N 5/23296* (2013.01); *H04N 5/23229* (2013.01)

(58) Field of Classification Search
CPC .......... H04N 5/23232; H04N 5/23235; H04N 5/2355; H04N 5/2356; H04N 5/3454; H04N 3/1562; H04N 5/335; H04N 5/369; H04N 5/341; H04N 5/343; H04N 5/3456; H04N 5/23296; H04N 5/23229; G09G 2320/068
See application file for complete search history.

(56) References Cited

U.S. PATENT DOCUMENTS

| | | | |
|---|---|---|---|
| 7,265,783 B2 * | 9/2007 | Fukuda ....................... | 348/240.2 |
| 7,688,364 B2 * | 3/2010 | LeGall et al. ............. | 348/240.99 |
| 8,077,225 B2 * | 12/2011 | Nakayama ................. | 348/240.1 |
| 8,836,821 B2 * | 9/2014 | Kurokawa .................. | 348/240.1 |
| 2001/0050712 A1 * | 12/2001 | Dunton et al. ................ | 348/220 |
| 2004/0095485 A1 * | 5/2004 | Ueda et al. .................. | 348/240.1 |
| 2006/0221213 A1 * | 10/2006 | Watanabe et al. .......... | 348/240.3 |
| 2006/0262974 A1 * | 11/2006 | Watanabe et al. ............. | 382/167 |
| 2007/0053068 A1 * | 3/2007 | Yamamoto et al. ........... | 359/676 |
| 2007/0188632 A1 * | 8/2007 | Kobayashi ............... | 348/240.99 |
| 2011/0242369 A1 * | 10/2011 | Misawa et al. ............. | 348/240.2 |
| 2012/0081577 A1 * | 4/2012 | Cote et al. ................ | 348/231.99 |
| 2012/0099004 A1 * | 4/2012 | Shibuno ..................... | 348/240.3 |
| 2014/0104459 A1 * | 4/2014 | Tanaka et al. ............... | 348/240.2 |

FOREIGN PATENT DOCUMENTS

| | | |
|---|---|---|
| JP | 2004-015517 A | 1/2004 |
| JP | 4697078 B2 | 6/2011 |

* cited by examiner

*Primary Examiner* — Aung S Moe
(74) *Attorney, Agent, or Firm* — Westerman, Hattori, Daniels & Adrian, LLP

(57) ABSTRACT

An imaging apparatus includes a solid-state image sensor that has a plurality of pixels arranged in a two-dimensional matrix form and outputs pixel signals according to subject light incident on each of the plurality of pixels in at least two or more drive modes, a first processing unit that performs, on the pixel signals output by the solid-state image sensor according to any one drive mode, the equal process to a first process performed when the solid-state image sensor outputs the pixel signals according to another drive mode and a pixel signal selection unit that selects any one of the pixel signals that are subject to the equal process to the first process performed by the first processing unit or the pixel signals that are subject to the first process performed by the solid-state image sensor according to the latter drive mode.

6 Claims, 12 Drawing Sheets

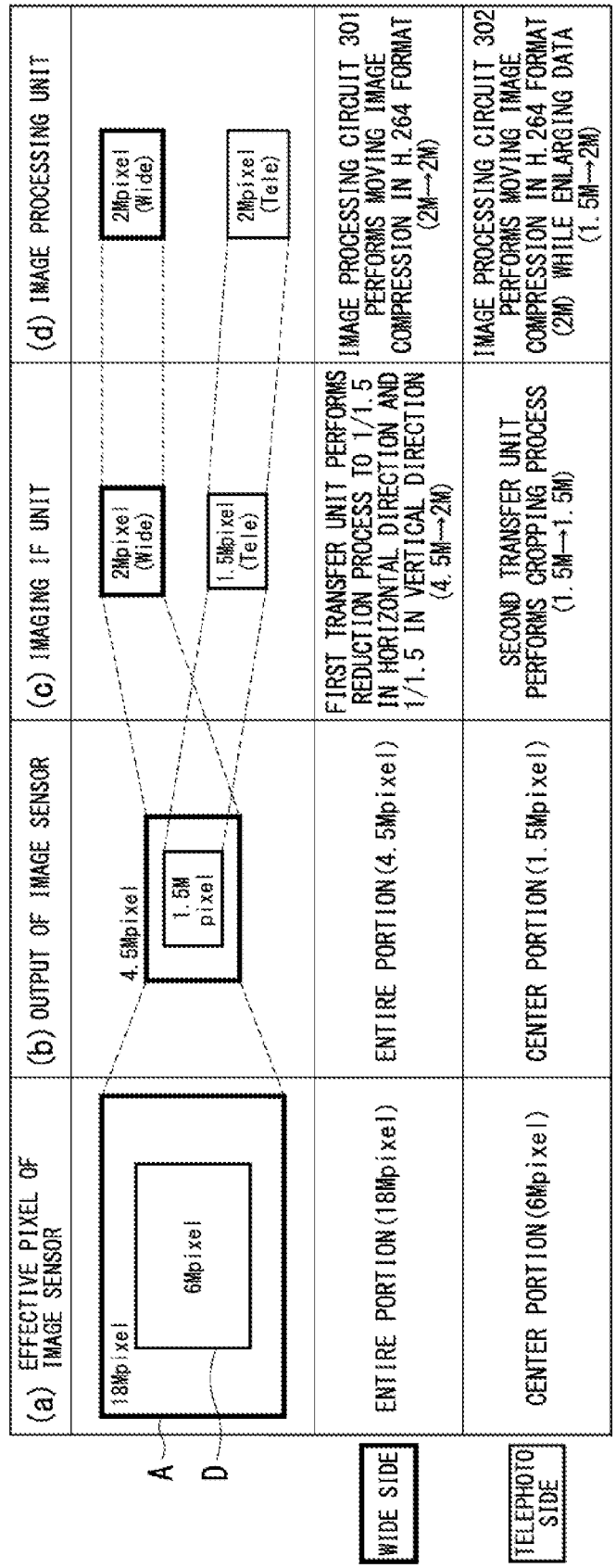

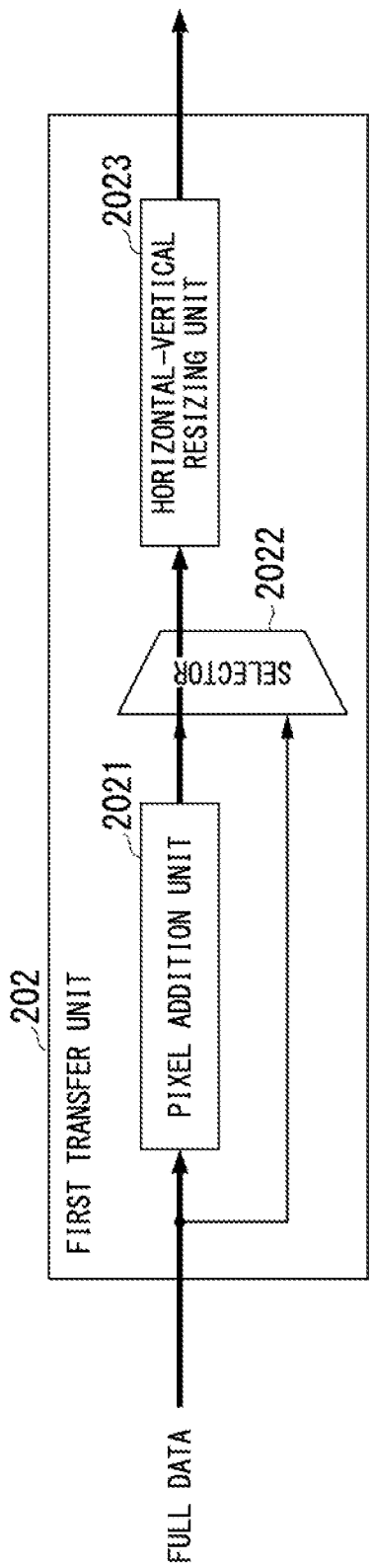

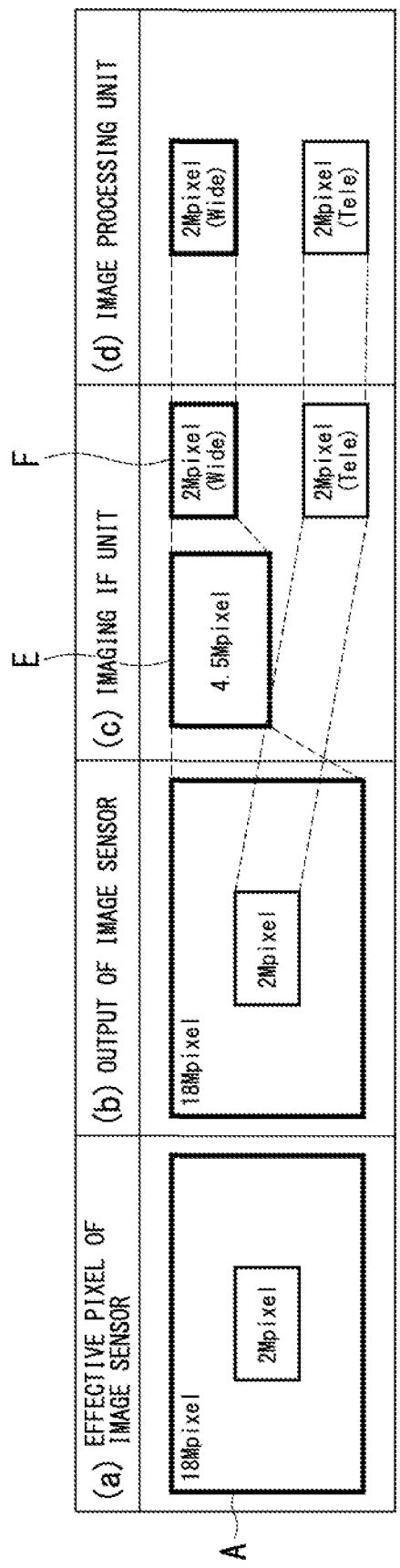

IMAGING APPARATUS

BACKGROUND OF THE INVENTION

1. Field of the Invention

The present invention relates to an imaging apparatus.

Priority is claimed on Japanese Patent Application No. 2012-227017, filed Oct. 12, 2012, the content of which is incorporated herein by reference.

2. Description of Related Art

Imaging apparatuses such as digital still cameras and video cameras that can photograph moving images generally have a zoom function such as optical zoom or electronic zoom. Using the zoom function, a subject an be photographed at various angles of view from a wide angle (hereinafter referred to as a "wide side") to a telephoto view (hereinafter referred to as a "telephoto side").

However, in a case in which a subject making active motions in, for example, a footrace in athletics is photographed, when a photographer (user) attempts to photograph the subject by raising the magnification of zoom, the photographer loses sight of the subject, in other words, it is difficult for the photographer to film the subject in an image. Conversely, when the subject is photographed on a wide side, the photographer seldom loses sight of the subject, but there is a problem in that display of the subject filmed in an image is small.

In order to solve this problem, a technology of an imaging apparatus having a function of photographing an image on a wide side (hereinafter referred to as a "wide-side image) and an image on a telephoto side (hereinafter, referred to as a "telephoto-side image") at the same time as in, for example. Japanese Patent (Granted) Publication No. 4697078 has been disclosed. According to the technology disclosed in Japanese Patent (Granted) Publication No. 4697078, a plurality of images having different angles of view (for example, two images which are an originally photographed wide-side image and a trimmed telephoto-side image) are recorded as one composite image by trimming photographed image data.

Japanese Unexamined Patent Application First Publication No. 2004-15517 discloses a technology of, for example, displaying an image obtained by reducing an entire photographed region and an image obtained by enlarging some regions of the image at the same time.

Using the technologies disclosed in Japanese Patent (Granted) Publication No. 4697078 and Japanese Unexamined Patent Application First Publication No. 2004-15517, it is possible to photograph a plurality of images having different angles of view such as a wide-side image and a telephoto-side image at the same time, and display them at the same time for review and accordingly, the problem described above can be avoided.

However, when there is an image having a large size to be processed, in other words, there are a large number of pixels that are subject to image processing in which various processes are performed on a photographed image, a load during the image processing increases, which leads to a lengthened processing time. Herein, a processing time of image processing performed in order to obtain a wide-side image and a telephoto-side image at the same time will be described. FIG. 9A and FIG. 9B are drawings for describing an example of a size of a telephoto-side image cropped out (trimmed) from a wide-side image. FIG. 9A illustrates an example of a region of a wide-side image in which a main subject appears small from which a telephoto-side image is cropped out, and FIG. 9B illustrates an example of a region of a wide-side image in which the main subject appears large from which a telephoto-side image is cropped out.

It is desirable to decide the degree of an angle of view (size) of a telephoto-side image cropped out from a photographed wide-side image according to the size of a main subject. To be more specific, it is desirable to set the region of the telephoto-side image T1 cropped out from the wide-side image W1 in which the main subject appears small to be small as illustrated in FIG. 9A, and to set the region of the telephoto-side image 12 cropped out from the wide-side image W2 in which the main subject appears large to be large as illustrated in FIG. 9B. Accordingly, the main subjects shown in the telephoto-side images come to have the same size.

SUMMARY OF THE INVENTION

According to a first aspect of the present invention, an imaging apparatus includes a solid-state image sensor that has a plurality of pixels arranged in a two-dimensional matrix form and outputs pixel signals according to subject light incident on each of the plurality of pixels in at least two or more drive modes, a first processing unit that performs, on the pixel signals output by the solid-state image sensor according to any one drive mode, an equal process to a first process performed when the solid-state image sensor outputs the pixel signals according to another drive mode, a pixel signal selection unit that selects any one of the pixel signals that are subject to the equal process to the first process performed by the first processing unit or the pixel signals that are subject to the first, process performed by the solid-state image sensor according to the latter drive mode, and a second processing unit that performs a second process on the pixel signals selected by the pixel signal selection unit.

According to a second aspect of the present invention, in the first aspect, the first process may be a process of reducing the pixel signals to be output by adding or thinning out each of the pixel signals output from each of the pixels that the solid-state image sensor has by a predetermined number for each of the pixel signals, and the second process may be a process of resizing the region of the pixels that are arranged in the solid-state image sensor expressed by the pixel signals that have undergone the first process to a region having predetermined sizes in the row direction and in the column direction.

According to a third aspect of the present invention, in the second aspect, a first conversion unit that has the first processing unit, the pixel signal selection unit, and the second processing unit, performs a first conversion process on pixel signals output from pixels arranged in a predetermined first pixel region in the region of all of the pixels arranged in the solid-state image sensor so as to convert the first pixel region of the size into a region of a predetermined size, and outputs first image data as a result of performing the first conversion process, a second conversion unit that performs a second conversion process on pixel signals output from pixels arranged in a predetermined second pixel region which is smaller than the first pixel region in the region of all of the pixels arranged in the solid-state image sensor so as to convert the second pixel region of the size into a region of a predetermined size, and outputs second image data as a result of performing the second conversion process, and a drive mode change unit that changes a drive mode of the solid-state image sensor according to the size of the second pixel region before the conversion may be further included.

According to a fourth aspect of the present invention, in the third aspect, the second pixel region may be decided based on the size of a main subject included in the first pixel region, and the drive mode change unit may cause the solid-state image sensor to be driven in a first drive mode in which the pixel signals of all of the pixels that the solid-state image sensor has are output when the number of pixels included in the second pixel region is smaller than a predetermined threshold value, and may cause the solid-state image sensor to be driven in a second drive mode in which the pixel signals of which the number of the signals is smaller than the number of pixel signals output in the first drive mode are output by performing the first process when the number of pixels included in the second pixel region is equal to or greater than the threshold value.

According to a fifth aspect of the present invention, in the fourth aspect, the pixel signal selection unit may select the pixel signals obtained by performing the equal process to the first process by the first processing unit on the pixel signals output from the solid-state image sensor according to the first drive mode when the solid-state image sensor is driven in the first drive mode, and may select the pixel signals output from the solid-state image sensor by performing the first process according to the second drive mode when the solid-state image sensor is driven in the second chive mode.

According to a sixth aspect of the present invention, in the fifth aspect, the first conversion process may be performed to resize the region of the pixels arranged in the solid-state image sensor corresponding to the size of the first pixel region to a region having predetermined sizes in the row direction and in the column direction through the first process and the second process.

According to a seventh aspect of the present invention, in the sixth aspect, the second conversion process may be a process of cropping out the region of the pixels arranged in the solid-state image sensor corresponding to the size of the second pixel region from the region of the pixels arranged in the solid-state image sensor corresponding to the size of the first pixel region.

BRIEF DESCRIPTION OF THE DRAWINGS

FIG. 5A is a diagram for describing still another example of the shifts of the number of pixels in each processing stage for generating images having different angles of view in the imaging apparatus according to the embodiment.

FIG. 7A is a diagram for describing a processing path of image data in the first transfer unit in the imaging IF unit included in the imaging apparatus of the embodiment.

FIG. 8A is a diagram for describing still another example of shifts of the number of pixels in each processing stage for generating images having different angles of view in the imaging apparatus according to the embodiment.

DETAILED DESCRIPTION OF THE INVENTION

Hereinafter, an embodiment of the present invention will be described with reference to the drawings. Description of the embodiment of the present invention is provided hereinbelow merely to describe inventions defined by the appending claims and equivalents thereof in detail, and it is obvious for those skilled in the art that the content of the present disclosure does not limit the inventions and equivalents.

Figure 1:
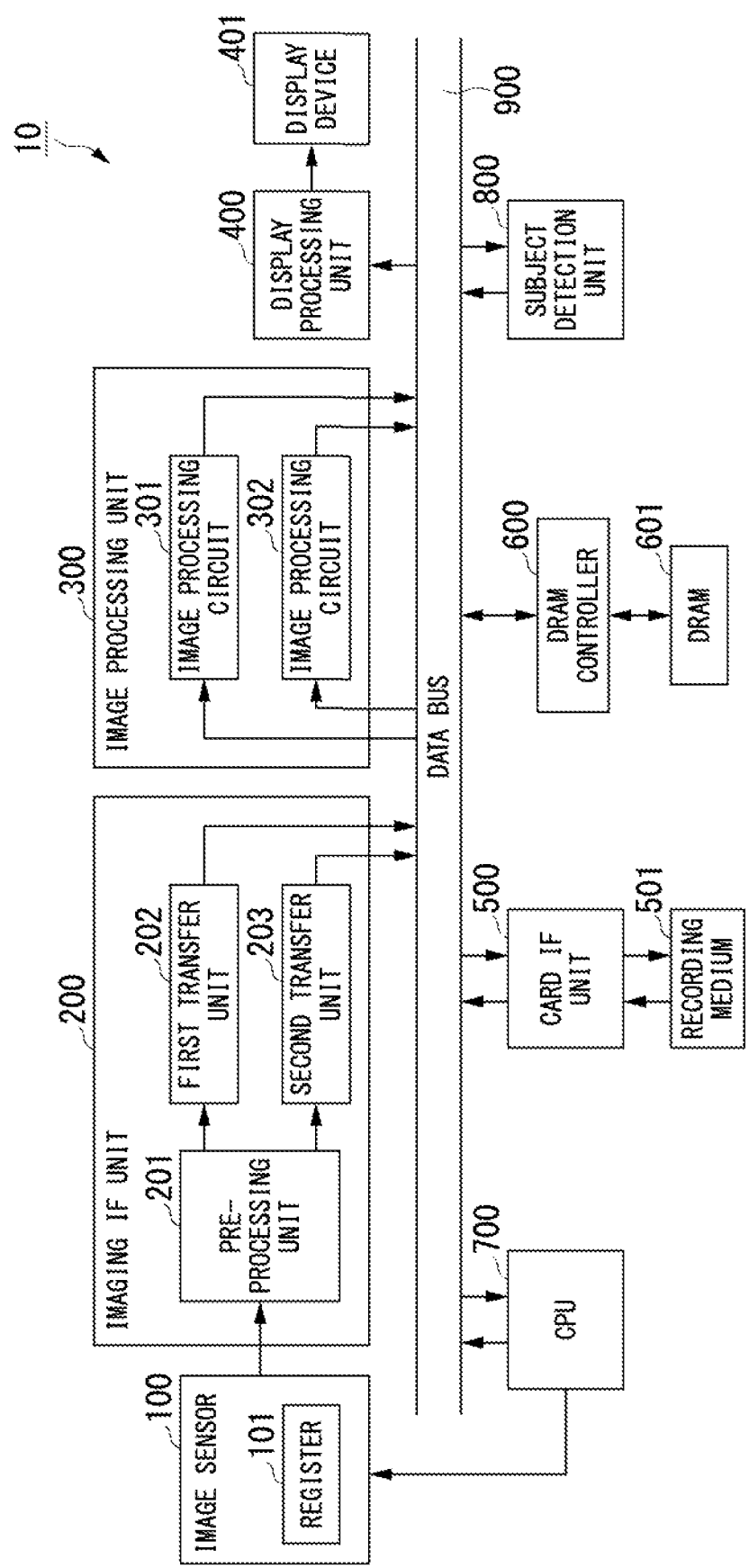
FIG. 1 is a block diagram illustrating a schematic constitution of an imaging apparatus according to an embodiment of the present invention.

FIG. 1 is a block diagram illustrating a schematic constitution of an imaging apparatus according to an embodiment of the present invention. In FIG. 1, the imaging apparatus 10 includes an image sensor 100, an imaging IF (interface) unit 200, an image processing unit 300, a display processing unit 400, a display device 401, a card IF (interface) unit 500, a recording medium 501, a DRAM controller 600, a. DRAM (Dynamic Random Access Memory) 601, a CPU 700, and a subject detection unit 800.

The imaging IF unit 200, the image processing unit 300, the display processing unit 400, the card IF unit 500, the DRAM controller 600, the CPU 700, and the subject detection unit 800 in the imaging apparatus 10 are connected to one another via a data bus 900, and reading of data from the DRAM 601 connected to the DRAM controller 600 and writing of data on the DRAM 601 are performed using, for example, DMA (Direct Memory Access).

The imaging apparatus 10 can photograph two images having different angles of view at the same time in one shot. In description provided below, the imaging apparatus 10 is assumed to photograph two images having different angles of view at the same time, which are an image on a wide side (hereinafter referred to as a "wide-side image") that is photographed in the same state as when a zoom lens is set to be on a wide angle side (wide side) and an image on a telephoto side (hereinafter referred to as a "telephoto-side image") that is photographed in the same state as when the zoom lens is set to be on a telephoto side (telephoto side).

The image sensor 100 is a solid-state image sensor represented by a CCD (Charge Coupled Device) image sensor or a CMOS (Complementary Metal-Oxide Semiconductor) image sensor that performs photoelectric conversion on an optical image of a subject formed by a zoom lens which is not shown. The image sensor 100 outputs a pixel signal according to subject light to the imaging IF unit 200 as input image data.

The image sensor 100 can be driven in a plurality of drive modes such as a drive mode in which all pixel signals are output (hereinafter referred to as a "still mode") and a drive mode in which pixel signals are added and then output (hereinafter referred to as a "pixel addition mode"). The image sensor 100 includes a register 101 that sets a drive mode of the image sensor 100. Drive of the image sensor 100 can be changed when the CPU 700 causes the register 101 to set a drive mode.

A constitution of changing a drive mode of the image sensor 100 is not limited only to the constitution of using the register 101 illustrated in FIG. 1, and various changing methods, for example, changing a drive mode according to a state of an input terminal of the image sensor 100, can be considered.

The imaging IF unit 200 retrieves the input image data input from the image sensor 100 and performs processes of pre-processing, resizing, cropping, and the like on the input image data, and transfers (writes) processed resultant image data to (on) the DRAM 601. The imaging IF unit 200 includes a pre-processing unit 201, a first transfer unit 202, and the second transfer unit 203. The first transfer unit 202 and the second transfer unit 203 included in the imaging IF unit 200 transfer (write) each piece of data for generating two images having different angles of view to (on) the DRAM 601.

The pre-processing unit 201 performs a pre-process such as defect correction, or shading correction on the input image data input from the image sensor 100, and outputs pre-processed resultant image data (hereinafter referred to as "pre-processed image data") to the first transfer unit 202 and the second transfer unit 203.

Each of the first transfer unit 202 and the second transfer unit 203 performs a process such as a resizing process or a cropping process for changing an angle of view on the pre-processed image data input from the pre-processing unit 201, and transfers (writes) processed resultant image data to (on) the DRAM 601. To be specific, when the imaging apparatus 10 photographs a wide-side image and a telephoto-side image at the same time, the first transfer unit 202 performs a process of changing the angle of view on the pre-processed image data, and then transfers (writes) image data of which the angle of view has been changed to a wide side (hereinafter referred to as "wide-side image data") to (on) the DRAM 601. The second transfer unit 203 performs a process of changing the angle of view on the pre-processed image data, and then transfers (writes) image data of which the angle of view has been changed to a telephoto side (hereinafter referred to as "telephoto-side image data") to (on) the DRAM 601. The process performed by the first transfer unit 202 and the second transfer unit 203 to change the angle of view will be described in detail later.

When each of the first transfer unit 202 and the second transfer unit 203 (particularly, the second transfer unit 203) performs the process of changing the angle of view, it is possible to change the angle of view to a proper degree in a proper position using information on a position and a size of a main subject detected by the subject detection unit 800 to be described later.

When the imaging apparatus 10 performs normal photographing, the first transfer unit 202 transfers (writes) image data obtained by performing a process on the pre-processed image data to (on) the DRAM 601.

Since a normal photographing operation of the imaging apparatus 10 is no different from an imaging apparatus of a prior art, description thereof will be omitted.

The image processing unit 300 acquires (reads) the wide-side image data and the telephoto-side image data recorded on the DRAM 601, performs various image processing such as noise removal, a YC conversion process, a resizing process, a JPEG compression process, and a moving image compression process such as an MPEG compression process or an H.264 compression process, and thereby generates image data for display and image data for recording. The image processing unit 300 acquires (reads) the image data for recording recorded on the DRAM 601, performs various image processing such as a moving image decompression process such as a JPEG decompression process an MPEG decompression process or a H.264 decompression process, and thereby generates image data for display. The image processing unit 300 transfers (writes) the generated image data for display and the image data for recording to the (on) the DRAM 601.

The image processing unit 300 includes two image processing circuits of an image processing circuit 301 and another image processing circuit 302 therein. When the imaging apparatus 10 performs normal photographing, image data for display and image data for recording generated in image processing performed by the image processing circuit 301 are transferred to (written on) the DRAM 601.

When the imaging apparatus 10 photographs a wide-side image and a telephoto-side image at the same time, image data for display and image data for recording generated in image processing performed on the wide-side image data by the image processing circuit 301 are transferred to (written on) the DRAM 601. Image data for display and image data for recording generated in image processing performed on the telephoto-side image data by the image processing circuit 302 are transferred to (written on the DRAM 601. The image processing performed by the image processing circuit. 301 and the image processing circuit 302 will be described in detail later.

The display processing unit 400 acquires (reads) the image data for display recorded on the DRAM 601, and performs display processing such as a process of superimposing data for OSD (On-Screen Display) display on the acquired image data for display. Then, the image data that has been processed for display is output to the display device 401.

The display device 401 is a display device such as a TFT (Thin Film Transistor) liquid crystal display (LCD) or an organic EL (Electro Luminescence) display, and displays an image according to image data that has undergone display processing and is output from the display processing unit 400.

The display device 401 may be an external display such as a television. In FIG. 1, the display device 401 is set as a constituent element of the imaging apparatus 10, however, the display device 401 may be attachable to or detachable from the imaging apparatus 10.

The card IF unit 500 acquires (reads) the image data for recording recorded on the DRAM 601, and records the data on the recording medium 501. The card IF unit 500 reads the image data recorded on the recording medium 501, and transfers (writes) the read image data to (on) the DRAM 601.

The recording medium 501 is a recording medium such as an SD memory card or CompactFlash (CF, a registered trademark), and the image data for recording output from the card IF unit 500 is recorded thereon. The recorded image data is read by the card IF unit 500. In FIG. 1, the recording medium 501 is also set as a constituent element of the imaging apparatus 10, however, the recording medium 501 can be attached to or detached from the imaging apparatus 10.

The DRAM controller 600 performs transfer (writing) of data to (on) the connected DRAM 601 and acquisition (reading) of data from the DRAM 601 according to a request to access the DRAM 601 made by a plurality of constituent elements connected to each other via, the data bus 900 in the imaging apparatus 10, for example, according to a DMA access request.

The DRAM 601 is a memory to which access is controlled by the DRAM controller 600. The DRAM 601 records various kinds of data in the course of a process performed by each constituent element of the imaging apparatus 10.

The CPU 700 controls the constituent elements of the imaging apparatus 10, in other words, controls the entire imaging apparatus 10.

For example, the CPU 700 controls operations of the constituent elements in the imaging apparatus 10 according to a photographing operation and a reproduction operation of the imaging apparatus 10. The CPU 700 sets a drive mode of the image sensor 100 in the register 101 included in the image sensor 100 when the imaging apparatus 10 performs a photographing operation. When the imaging apparatus 10 performs a photographing operation, for example, the CPU 700 controls a zoom lens, which is not illustrated, to be on a wide angle side (wide side), or a telephoto side (telephoto side), or in an intermediate state thereof.

The subject detection unit 800 detects a position and a size of a photographed main subject. The subject detection unit 800 has a function of detecting a feature point in an image (detecting a face or an organ (an eye or a nose), or the like), and a function of tracing a portion to be noted that has been detected once (motion vector detection represented by block matching, tracing of a color component, or the like), and detects a position of a size of a main subject using the functions. The subject detection unit 800 transfers (writes) information on the position and the size of the detected main subject to (on) the DRAM 601.

The information on the position and the size of the main subject detected by the subject detection unit 800 may be configured to directly output to the CPU 700, or may be configured to output to each of the first transfer unit 202 and the second transfer unit 203 of the imaging IF unit 200.

With the configuration as described above, the imaging apparatus 10 photographs two images having different angles of view (a wide-side image and a telephoto-side image) at the same time.

Figure 2:
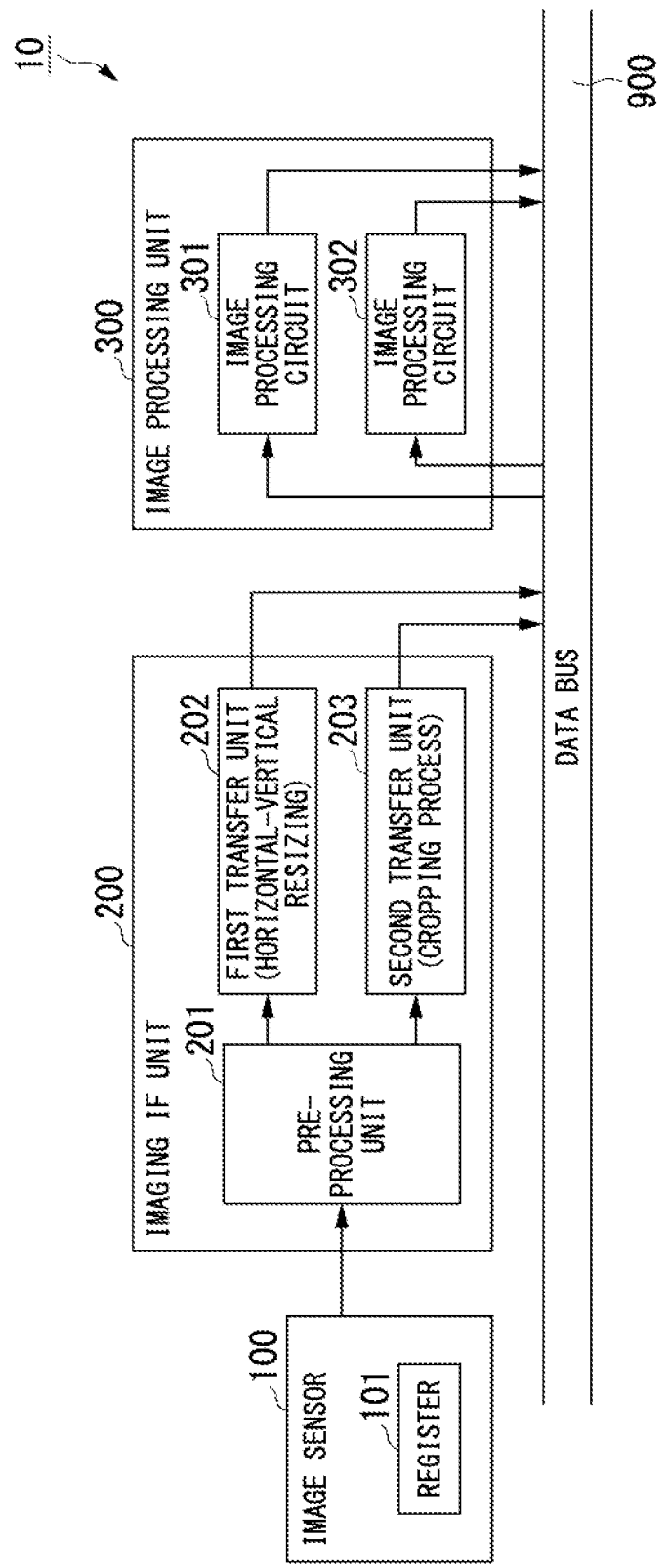
FIG. 2 is a block diagram illustrating a schematic constitution of constituent elements involved in generation of images having different angles of view in the imaging apparatus according to the embodiment.

Next, an operation of photographing a wide-side image and a telephoto-side image at the same time using the imaging apparatus 10 will be described. FIG. 2 is a block diagram illustrating a schematic constitution of constituent elements involved in generation of images having different angles of view in the imaging apparatus 10 according to the present embodiment. FIG. 2 only illustrates the image sensor 100, the imaging IF unit 200, the image processing unit 300, and the data bus 900 which are involved in the operation of photographing a wide-side image and a telephoto-side image at the same time among the constituent elements of the imaging apparatus 10 illustrated in FIG. 1.

As illustrated in FIG. 2, in the imaging apparatus 10, the first transfer unit 202 included in the imaging IF unit 200 has a "function of a horizontal-vertical resizing process" as a function of changing an angle of view, and the second transfer unit 203 has a "function of a cropping process" as a function of changing an angle of view. In the description provided below a case in which the imaging apparatus 10 photographs moving image will be described. Photographing a moving image using the imaging apparatus 10 is performed according to the following steps.

(Step 1) First, in a state of a, zoom lens set to be on a wide angle side (wide side), an optical image of a subject is formed on the image sensor 100. The image sensor 100 outputs a pixel signal (input image data) according to the formed image of the subject light to the imaging IF unit 200.

(Step 2) The pre-processing unit 201 of the imaging IF unit 200 first performs a pre-process on the input image data input from the image sensor 100, and then outputs the pre-processed image data to the first transfer unit 202 and the second transfer unit 203. Then, the first transfer unit 202 performs a horizontal-vertical resizing process on the pre-processed image data input from the pre-processing unit 201, and records (writes) wide-side image data on the DRAM 601. The second transfer unit 203 performs a cropping process on the pre-processed image data input from the pre-processing unit 201, and records (writes) telephoto-side image data on the DRAM 601.

(Step 3) The image processing unit 300 generates image data for display (hereinafter referred to as "display moving image data") and image data for recording (hereinafter referred to as "recording moving image data") of the wide side and the telephoto side which are obtained by performing a moving image compression process of an H.264 format on the wide-side image data and the telephoto-side image data recorded on the DRAM 601, and the data is recorded (written) on the DRAM 601 again.

When the image processing unit 300 performs the moving image compression process, as described above, although each of the image processing circuit 301 and the image processing circuit 302 performs the moving image compression process only on either image data of the wide-side image data or the telephoto-side image data, thereby generating display moving image data and recording moving image data, when the display moving image data and recording moving image data are mentioned without discrimination in description below, they are simply referred to as "moving image data."

Then, the display processing unit 400 causes the display device 401 to display the display moving image data recorded on the DRAM 601. At that moment, the display processing unit 400 can cause only display moving image data on either of the wide side or the telephoto side to be displayed on the entire screen of the display device 401. The display processing unit 400 can also cause two pieces of display moving image data of the wide side and the telephoto side to be displayed at the same time by for example, dividing the display device 401 into a right portion and a left portion.

The card IF unit 500 causes the recording moving image data recorded on the DRAM 601 to be recorded on the recording medium 501. At this moment, the card IF unit 500 can cause two pieces of recording moving image data of the wide side and the telephoto side to be recorded on the recording medium 501 as different files which relate to the respective data. The card IF unit 500 can also cause the two pieces of recording moving image data of the wide side and the telephoto side to be recorded on the recording medium 501 by combining (merging) the data as one file. The card IF unit 500 can also cause only recording moving image data of either side of the wide side or the telephoto side to be recorded on the recording medium 501.

According to the above steps, the imaging apparatus 10 generates two pieces of image data having different angles of view which is wide-side image data and telephoto-side image data from input image data which is obtained from photographing in the state of the zoom lens is set on the wide angle side (wide side), the image processing unit 300 performs the moving image compression process on each of the two pieces of image data and thereby wide-side moving range data and telephoto-side moving image data is generated. Then, while two pieces of display moving image data of the wide side and the telephoto side are displayed on the display device 401, two pieces of recording moving image data of the wide side and the telephoto side are recorded on (stored in) the recording medium 501. Accordingly, even when a subject makes active motions, a photographer (user) can photograph the subject without losing sight of the subject.

Herein, operations of the constituent elements of the imaging apparatus 10 performed when a wide-side image and a telephoto-side image are photographed at the same time will be described focusing on a scale (size) of an image to be processed by each of the constituent elements, in other words, the number of pixels of image data to be processed. The operations of the constituent elements included in the imaging apparatus 10 differ according to a scale (degree) of an angle of view of a telephoto-side image according to the size of a main subject, in other words, a difference in the numbers of pixels of image data included in an angle of view of a telephoto-side image cropped out from a wide-side image.

FIGS. 3, 4, 5A, and 5B are diagrams for describing examples of shifts of the number of pixels in each processing step for generating images having different angles of view in the imaging apparatus 10 according to the present embodiment. Each of FIGS. 3, 4, 5A, and 5B illustrates a difference of the constituent operations differing from the degrees of angles of view of a telephoto-side image. FIGS. 3, 4, 5A, and 5B show examples in which the imaging apparatus 10 generates wide-side moving image data and telephoto-side moving image data of 2 million pixels (2 megapixels) from input image data of the image sensor 100 when the number of effective pixels of the image sensor 100 is 18 million pixels (18 megapixels).

First of all, the shifts of the number of pixels of image data in each processing step when the number of pixels of telephoto-side image data cropped out as a telephoto-side image is the same as the number of pixels (2 megapixels) of moving image data of a telephoto side generated by the imaging apparatus 10 be described with reference to FIG. 3. First, the shifts of the number of pixels of image data processed by each constituent element when the imaging apparatus 10 generates moving image data of a wide side will be described.

Figure 3:
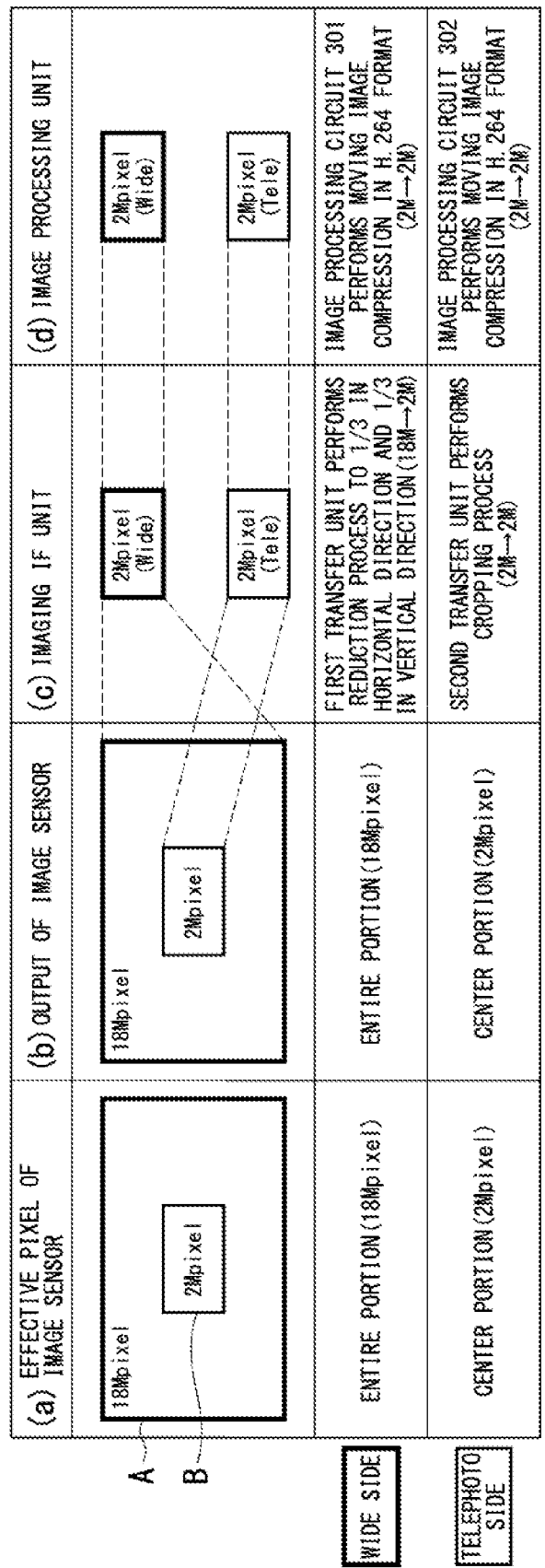
FIG. 3 is a diagram for describing an example of shifts of the number of pixels in each processing stage for generating images having different angles of view in the imaging apparatus according to the embodiment.

In generation of moving image data of the wide-side by the imaging apparatus 10, the image sensor 100 is driven in a still mode in which all pixel signals are output, and accordingly, input image data (18 megapixels) of a region A which corresponds to all effective pixels of the image sensor 100 shown in (a) of FIG. 3 is output to the imaging IF unit 200 (see (b) of FIG. 3).

Then, the imaging IF unit 200 performs pre-processing on the input image data (18 megapixels) input from the image sensor 100 using the pre-processing unit 201, and outputs the pre-processed image data (18 megapixels) to the first transfer unit 202. Then, the first transfer unit 202 performs a horizontal-vertical resizing process on the pre-processed image data, and then records (writes) wide-side image data of which the number of pixels has been changed on the DRAM 601 as shown in (c) of FIG. 3. To be more specific, the first transfer unit 202 performs the horizontal-vertical resizing process to reduce the horizontal direction of the pre-processed image data having 18 megapixels to ⅓ thereof and the vertical direction to ⅓ thereof so that the data is changed into wide-side image data having 2 megapixels, and then records (writes) the data on the DRAM 601.

Then, the image processing unit 300 performs a moving image compression process on the wide-side image data (2 megapixels) that has undergone the horizontal-vertical resizing process by the imaging IF unit 200 to generate moving image data of the wide side having 2 megapixels as shown in (d) of FIG. 3, and records (writes) the data on the DRAM 601 again. To be more specific, the image processing circuit 301 performs a moving image compression process of the H.264 format on the wide-side image data having 2 megapixels that has undergone the horizontal-vertical resizing process by the first transfer unit 202 to generate moving image data of the wide-side having 2 megapixels, and then records (writes) the data on the DRAM 601 again. The moving image data of the wide side having 2 megapixels generated here is then displayed on the display device 401, or recorded (stored) on the recording medium 501.

Next, shifts of the number of pixels of image data processed by each constituent element when the imaging apparatus 10 generates moving image data of the telephoto side will be described. In the generation of the moving image data of the telephoto side by the imaging apparatus 10, input image data of a region B obtained by, for example, cropping a center portion having 2 megapixels from the region A of all of the effective pixels of the image sensor 100 as shown in (a) of FIG. 3 is processed.

In the imaging IF unit 200, the pre-processed image data having 18 megapixels corresponding to the region A that has undergone the pre-processing by the pre-processing unit 201 is also output to the second transfer unit 203. Then second transfer unit 203 performs a cropping process on the pre-processed image data, and records (writes) telephoto-side image data corresponding to the region B on the DRAM 601 as shown in (c) of FIG. 3. To be specific, the second transfer unit 203 generates the telephoto-side image data having 2 megapixels by cropping the center portion of the pre-processed image data having 18 megapixels, and records (writes) the data on the DRAM 601.

Then, the image processing unit 300 performs a moving image compression process on the telephoto-side image data (2 megapixels) that has undergone the cropping process by the imaging IF unit 200 to generate moving image data of the telephoto side having 2 megapixels as shown in (d) of FIG. 3, and records (writes) the data on the DRAM 601 again.

To be specific, the image processing circuit 302 performs a moving image compression process of the H.264 format on the telephoto-side image data having 2 megapixels that has undergone the cropping process by the second transfer unit 203 to generate the moving image data of the telephoto side having 2 megapixels, and records (writes) the data on the DRAM 601 again. The moving image data of the telephoto side having 2 megapixels generated here is then displayed on the display device 401, or recorded (stored) on the recording medium 501.

Next, shifts of the number of pixels of image data in each processing stage when the number of pixels of telephoto-side image data cropped as a telephoto-side image is smaller than the number of pixels (2 megapixels) of moving image data of the telephoto side generated by the imaging apparatus 10, in other words, when a main subject appears small in a wide-side image, will be described with reference to FIG. 4.

The shifts of the number of pixels of image data processed by each constituent element during generation of moving image data of a wide side by the imaging apparatus 10 when the main subject appears small in the wide-side image have the same tendency as the shifts illustrated in FIG. 3. Thus, description of generation of moving image data of the wide side by the imaging apparatus 10 with reference to FIG. 4 will be omitted.

Next, shifts of the number of pixels of image data processed by each constituent element during the generation of the moving image data of the telephoto side by the imaging apparatus 10 when the main subject appears small in the wide-side image will described.

Figure 4:
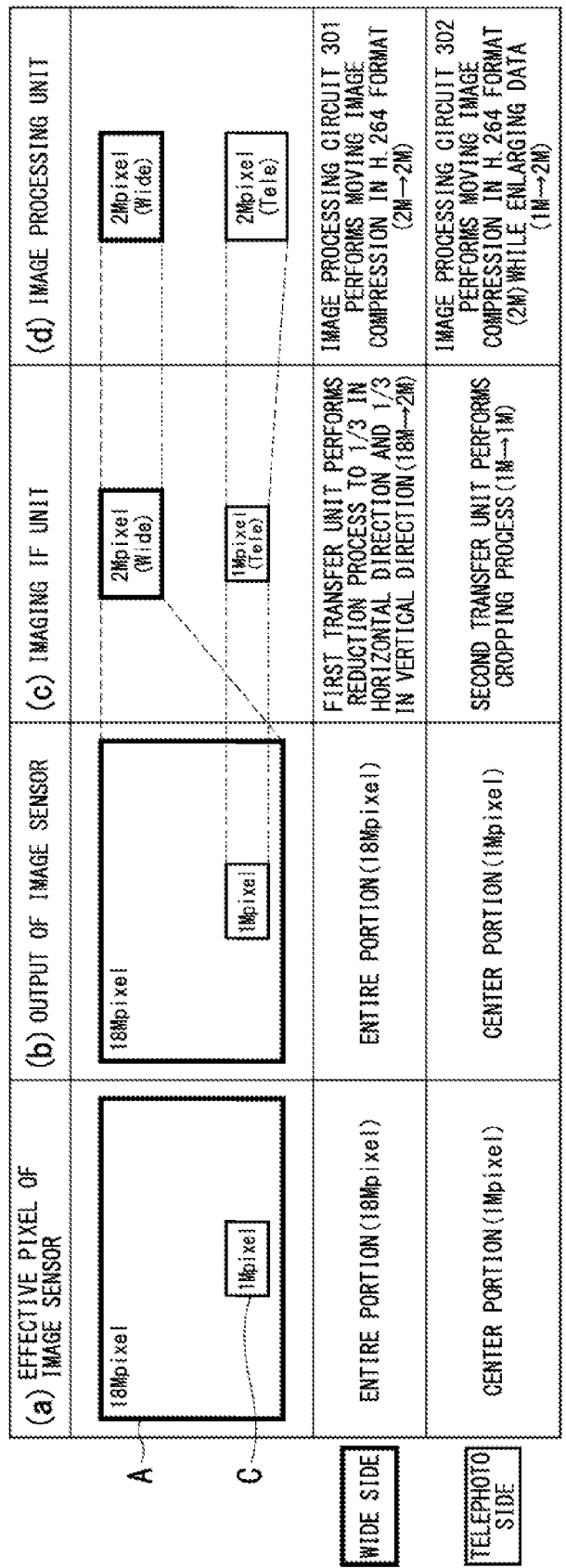
FIG. 4 is a diagram for describing another example of the shifts of the number of pixels in each processing stage for generating images having different angles of view in the imaging apparatus according to the embodiment.

In the generation of the moving image data of the telephoto side by the imaging apparatus 10 when the main subject appears small in the wide-side image, input image data of a region C obtained by for example, cropping a center portion of 1 megapixel out from the region A of the entire effective pixel of the image sensor 100 is processed as illustrated in (a) of FIG. 4. In this case, the second transfer unit 203 performs cropping process on pre-processed image data having 18 megapixels corresponding to the region A that has undergone pre-processing by the pre-processing unit 201, and records (writes) the telephoto-side image data corresponding to the region C on the DRAM 601 as illustrated in (c) of FIG. 4. To be more specific, the second transfer unit 203 generates the telephoto-side image data having 1 megapixel by cropping out the center potion of the pre-processed image data having 18 megapixels, and records (writes) the data on the DRAM 601.

Then, the image processing unit 300 performs a moving image compression process on the telephoto-side image data (1 megapixel) that has undergone the cropping process by the imaging IF unit 200 while performing a decompression process thereon so as to have the number of pixels (2 megapixels) of moving image data of the telephoto side generated by the imaging apparatus 10, thereby generates moving image data of the telephoto side having 2 megapixels as illustrated in (d) of FIG. 4, and records (writes) the data on the DRAM 601 again. To be more specific, the image processing circuit 302 performs a decompression process for converting the telephoto-side image data having 1 megapixel that has undergone the cropping process by the second transfer unit 203 into the telephoto-side image data having 2 megapixels. Then, the image processing circuit 302 performs a moving image compression process of the H.264 format on the telephoto-side image data having 2 megapixels after the decompression process to generate the moving image data of the telephoto side having 2 megapixels, and records (writes) the data on the DRAM 601 again. The moving image data of the telephoto side having 2 megapixels generated here is then displayed on the display device 401 or recorded (stored) on the recording medium 501.

Next, shifts of the number of pixels of image data in each processing step when the number of pixels of telephoto-side image data cropped as a telephoto-side image is greater than the number of pixels (2 megapixels) of moving image data of the telephoto side generated by the imaging apparatus 10, in other words, when a main subject appears large in a wide-side image, will be described with reference to FIGS. 5A and 5B. First, shifts of the number of pixels of image data processed by each constituent element during generation of moving image data of the wide side by the imaging apparatus 10 when the main subject appears large in a wide-side image will be described.

In the generation of the moving image data of the wide side by the imaging apparatus 10 when the main subject appears large in the wide-side image, when input image data (18 megapixel) of the region A corresponding to all of the effective pixels of the image sensor 100 illustrated in (a) of FIG. 5A is output to the imaging IF unit 200, the image sensor 100 is driven in the pixel addition mode in which pixel signals are added and then output. The changing (setting) of the drive mode of the image sensor 100 to the pixel addition mode is performed by the CPU 700 before the image sensor 100 outputs the input image data. Accordingly, the image sensor 100 outputs the input image data of which the number of pixels is reduced from 18 megapixels by performing the pixel addition to the imaging IF unit 200 as illustrated in (b) of FIG. 5A. To be specific, the image sensor 100 performs the pixel addition in which the horizontal direction of the input image data having 18 megapixels is reduced to ½ thereof and the vertical direction is reduced to ½ thereof, and then outputs the input image data of which the number of pixels is changed to 4.5 megapixels to the imaging IF unit 200. In this case, the angle of view at which the image sensor 100 performs photographing does not change.

Then, the imaging IF unit 200 performs pre-processing on the input image data (4.5 megapixels) input from the image sensor 100 using the pre-processing unit 201, and then outputs the pre-processed image data (4.5 megapixels) to the first transfer unit 702. Then, the first transfer unit 202 performs a horizontal-vertical resizing process on the pre-processed mage data, and then records (writes) wide-side image data of which the number of pixels is changed on the DRAM 601 as illustrated in (c) of FIG. 5A. To be more specific, the first transfer unit 202 performs the horizontal-vertical resizing process in which the horizontal direction of the pre-processed image data having 4.5 megapixels is reduced to 1/1.5 thereof and the vertical direction is reduced to 1/1.5 thereof so as to change the data into wide-side image data having 2 megapixels, and then records (writes) the data on the DRAM 601.

Then the image processing unit 300 performs a moving image compression process on the wide-side image data (2 megapixels) that has undergone the horizontal-vertical resizing process by the imaging IF unit 200 to generate moving image data of the wide side having 2 megapixels as illustrated in (d) of FIG. 5A, and then records (writes) the data on the DRAM 601 again. To be more specific, the image processing circuit 301 performs the moving image compression process of the H.264 format on the wide-side image data having 2 megapixels that has undergone the horizontal-vertical resizing process by the first transfer unit 202 to generate the moving image data of the wide side having 2 megapixels, and then records (writes) the data on the DRAM 601 again. The moving image data of the wide side having 2 megapixels generated here is then displayed on the display device 401, or recorded (stored) on the recording, medium 501.

Next, shifts of the number of pixels of image data processed by each constituent element during generation of moving image data of the telephoto side by the imaging apparatus 10 when a main subject appears large in a wide-side image will be described.

In the generation of moving image data of the telephoto side by the imaging apparatus 10 when the main subject appears large in the wide-side image, input image data of a region D obtained by, for example, cropping a center portion of 6 megapixels from the region A of all of the effective pixels of the image sensor 100 is processed as illustrated in (a) of FIG. 5A. Since input image data of which the number of pixels is reduced to 4.5 megapixels by performing the pixel addition in the image sensor 100 is input to the imaging IF unit 200, the imaging IF unit 200 processes input image data of a region after the pixel addition corresponding to the region D of 6 megapixels cropped out from the image sensor 100. Thus, the second transfer unit 203 performs a cropping process on pre-processed image data having 4.5 megapixels corresponding to the region A that has undergone pre-processing by the pre-processing unit 201, and then records (writes) telephoto-side image data having 1.5 megapixels corresponding to the region D as illustrated in (c) of FIG. 5A on the DRAM 601. To be more specific, the second transfer unit 203 generates the telephoto-side image data having 1.5 megapixels by cropping a region corresponding to the region obtained by reducing each of the horizontal direction and the vertical direction of the region D to ½ thereof from the center portion of the pre-processed image data having the 4.5 megapixels, and then records (writes) the data on the DRAM 601.

Then, the image processing unit 300 performs a moving image compression process on the telephoto-side image data (1.5 megapixels) that has undergone the cropping process by the imaging IF unit 200 while performing a decompression process thereon so as to have the number of pixels (2 megapixels) of moving image data of the telephoto side generated by the imaging apparatus 10 to generate the moving image data having 2 megapixels as illustrated in (d) of FIG. 5A, and records (writes) the data on the DRAM 601 again. To be more specific, the image processing circuit 302 performs the decompression process in which the telephoto-side image data having 1.5 megapixels that has undergone the cropping process by the second transfer unit 203 is converted into the telephoto-side image data having 2 megapixels. Then, the image processing circuit 302 performs the moving image compression process of the H.264 format on the telephoto-side image data having 2 megapixels after the decompression process to generate the moving image data having 2 megapixels, and records (writes) the data on the DRAM 601 again. The moving image data of the telephoto side having 2 megapixels generated here is then displayed on the display device 401, or recorded (stored) on the recording medium 501.

In this manner, in the imaging apparatus 10, a drive mode of the image sensor 100 is changed according to the number of pixels of telephoto-side image data that is cropped as a telephoto-side image. Accordingly even when a main subject appears large in a wide-side image, in other words, even when the number of pixels of telephoto-side image data cropped as a telephoto-side image is large, the number of pixels that will actually undergo image processing can be reduced.

Setting a drive mode of the image sensor 100 to be changed at all times, in other words, driving the image sensor 100 in the pixel addition mode at all times regardless of the number of pixels of telephoto-side image data cropped out as a telephoto-side image, can also be considered. However, in such a case, even when the number of pixels of the telephoto-side image data is smaller than the number of pixels (2 megapixels) of the moving image data of the telephoto side generated by the imaging apparatus 10, in other words, even when a main subject appears small in a wide-side image, the number of pixels of input image data is reduced by the image sensor 100. For this reason, as the moving image data of the telephoto side is generated based on the telephoto-side image data cropped out from the image input data of which the number of pixels is reduced, the quality of the telephoto-side image deteriorates. Accordingly, when the number of pixels of the telephoto-side image data cropped out as the telephoto-side image is the same as or smaller than the number of pixels of the moving image data of the telephoto side generated by the imaging apparatus 10, not changing the drive mode of the image sensor 100 is advantageous for the quality of the image.

When a main subject appears large in a wide-side image, the image sensor 100 can be driven in the same manner as when the number of pixels of the telephoto-side image data illustrated in FIG. 3 is the same as the number of pixels of the moving image data of the telephoto side, or when the number of pixels of the telephoto-side image data illustrated in FIG. 4 is smaller than the number of pixels of the moving image data of the telephoto side. In other words, even when the number of pixels of the telephoto-side image data cropped out as a telephoto-side image is greater than the number of pixels of the moving image data of the telephoto side generated by the imaging apparatus 10, the image sensor 100 can be driven in the still mode without changing the drive mode, and the moving image data of the telephoto side can also be generated from the input image data (18 megapixels) of the region A corresponding to all of the effective pixels of the image sensor 100.

However, it is desirable to generate the moving image data of the telephoto side by changing the drive mode of the image sensor 100 to the pixel addition mode when the main subject appears large in the wide-side image as described above. This is because, since the function of the second transfer unit 203 to perform the process of changing an angle of view is only the function of the cropping process, the number of pixels of the telephoto-side image data recorded (written) on the DRAM 601 after performing the cropping process by the second transfer unit 203 increases, and accordingly a processing load of the image processing circuit 302 that will perform next image processing increases. For this reason, reducing the number of pixels of the telephoto-side image data recorded (written) on the DRAM 601 in such a way that the drive mode of the image sensor 100 is changed to the pixel addition mode and the second transfer unit 203 performs the cropping process as illustrated in (b) of FIG. 5A is advantageous in terms of a processing load of the image processing circuit 302 since the load exerted during image processing does not increase.

Here, shifts of the number of pixels of image data in each processing stage when the drive mode of the image sensor 100 is not changed, in other words, when the image sensor 100 is driven in the still mode if a main subject appears large in a wide-side image, will be described. First, shifts of the number of pixels of image data processed by each constituent element during generation of moving image data of the wide side by the imaging apparatus 10 when the main subject appears large in the wide-side image will be described.

Figure 5B:
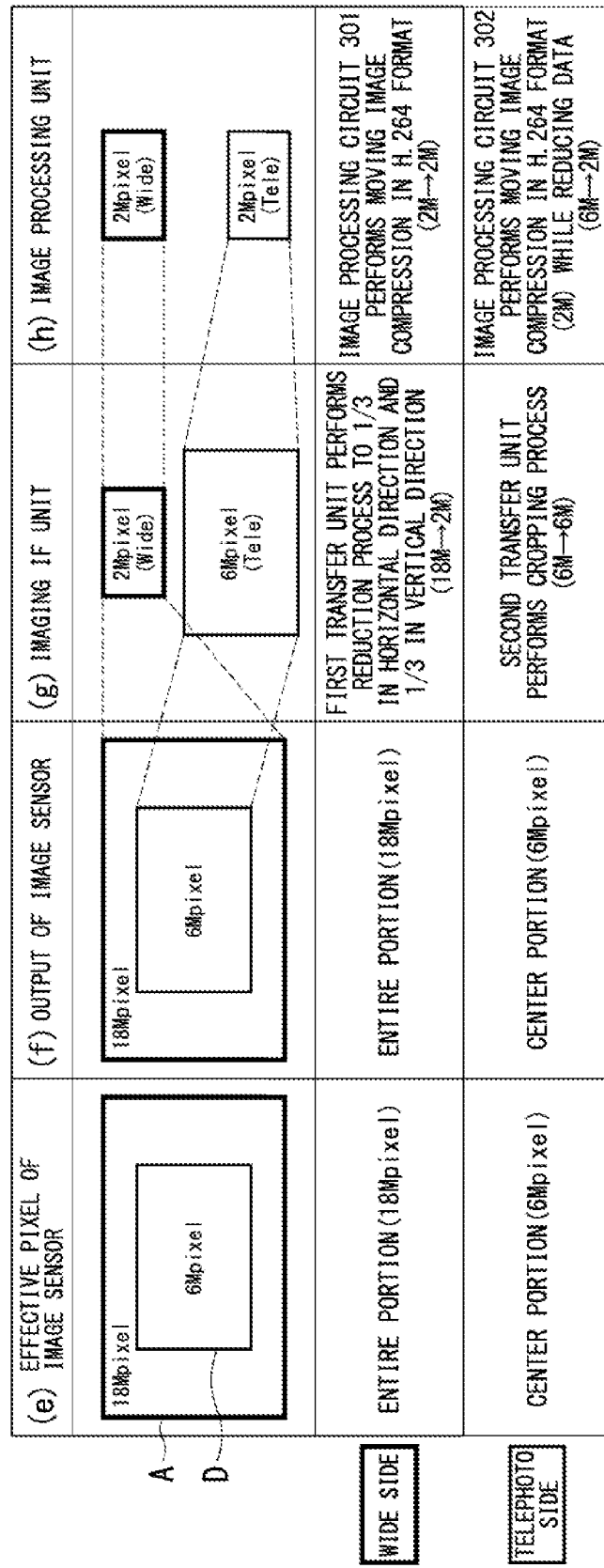
FIG. 5B is a diagram for describing still another example of the shifts of the number of pixels in each processing stage for generating images having different angles of view in the imaging apparatus according to the embodiment.

In the generation of the moving image data of the wide side by the imaging apparatus 10 when the main subject appears large in the wide-side image, the input image data (18 megapixels of the region A corresponding to all of the effective pixels of the image sensor 100 illustrated in (e) of FIG. 5B is output to the imaging IF unit 200 by driving the image sensor 100 in the still mode in which all pixel signals are output see (f) of FIG. 5B). The region A in the image sensor 100 illustrated in (e) of FIG. 5B is the same as the region A in the image sensor 100 illustrated in (a) of FIG. 5A.

Then, the imaging IF unit 200 performs pre-processing on the input image data (18 megapixels) input from the image sensor 100 using the pre-processing unit 201, and outputs the pre-processed image data (18 megapixels) to the first transfer unit 202. Then, the first transfer unit 202 performs a horizontal-vertical resizing process in which the horizontal direction of the pre-processed image data having 18 megapixels is reduced to ⅓ thereof and the vertical direction is reduced to ⅓ thereof to generate wide-side image data having 2 megapixels as illustrated in (g) of FIG. 5B, of which the number of pixels has been changed, and then records (writes) the data on the DRAM 601.

Then the image processing unit 300, the image processing circuit 301 performs a moving image compression process of the H.264 format on the wide-side image data having 2 megapixels that has undergone the horizontal-vertical resizing process by the first transfer unit 202 to generate moving image data of the wide side having 2 megapixels as illustrated in (h) of FIG. 5B, and then records (writes) the data on the DRAM 601 again.

Next, shifts of the number of pixels of image data processed by each constituent element during the generation of moving image data of the telephoto side by the imaging apparatus 10 when the main subject appears large in the wide-side image will be described. Also in the generation of the moving image data of the telephoto side by the imaging apparatus 10, input image data of the region D obtained by for example, cropping a center portion of 6 megapixels in the same manner as the region D illustrated in (a) of FIG. 5A is processed.

In the imaging IF unit 200, the second transfer unit 203 performs a cropping process on the center portion of the pre-processed image data having 18 megapixels to generate telephoto-side image data having 6 megapixels corresponding to the region D as illustrated in (g) of FIG. 5B, and then records (writes) the data on the DRAM 601.

Then, the image processing unit 300 performs a moving image compression process on the telephoto-side image data (6 megapixels) that has undergone the cropping process by the imaging IF unit 200 while performing a process of reducing the number of pixels (2 megapixels) of moving image data of the telephoto side generated by the imaging apparatus 10 to generate the moving image data, having 2 megapixels as illustrated in (h) of FIG. 5B, and then records (writes) the data on the DRAM 601 again. To be more specific, the image processing circuit 302 performs the reduction process in which the telephoto-side image data having 6 megapixels that has undergone the cropping process by the second transfer unit 203 is converted into the telephoto-side image data having 2 megapixels. Then, the image processing circuit 302 performs the moving image compression process of the H.264 format on the telephoto-side image data having 2 megapixels after the reduction process to generate the moving image data of the telephoto side having 2 megapixels, and then records (writes) the data on the DRAM 601 again.

As described above, the imaging apparatus 10 can generate the same moving image data of the telephoto side (2 megapixels) with the reduction process performed by the image processing circuit 302 by changing the drive mode of the image sensor 100 to the pixel addition mode, instead of reducing the input image data in the image sensor 100.

However, as understood from the comparison of (c) of FIG. 5A and (g) of FIG. 5B, (g) of FIG. 5B, i.e., the generation of the moving image data of the telephoto side without changing the drive mode of the image sensor 100, has a larger number of pixels of the telephoto-side image data processed by the image processing circuit 302. This indicates not only that a processing load of the image processing circuit 302 increases, but also that the amount of the telephoto-side image data transferred to the DRAM 601 through DMA access via, the data bus 900 of the imaging apparatus 10 is large. To be more specific, when the telephoto-side image data (1.5 megapixels) recorded (written) on the DRAM 601 by the second transfer unit 203 is combined with the telephoto-side image data (1.5 megapixels) acquired (read) by the image processing circuit 302 from the DRAM 601, the outcome is 3 megapixels when the drive mode of the image sensor 100 is changed, but when the drive mode of the image sensor 100 is not changed, the outcome is 6 megapixels+6 megapixels=12 megapixels. If the amount of the telephoto-side image data is large as described above, there is a possibility of problems such as shortening of intervals of consecutive photographing, a frame drop in moving image photographing, and an increase in power consumption in the imaging apparatus 10. Thus, when the main subject appears large in the wide-side image, the processes illustrated in (a) of FIG. 5A to (d) of FIG. 5A for generating the moving image data of the telephoto side by changing the drive mode of the image sensor 100 is more advantageous in terms of the processing load of the image processing circuit 302 and the performance of the imaging apparatus 10 than the processes illustrated in (e) of FIG. 5B to (h) of FIG. 5B for generating the moving image data of the telephoto side without changing the drive mode of the image sensor 100. In other words, by generating the moving image data of the telephoto side in the changed drive mode of the image sensor 100, deterioration of the performance of the imaging apparatus 10 such as shortening of intervals of consecutive photographing, a frame drop in moving image photographing, and an increase in power consumption of the imaging apparatus 10 can be suppressed.

As described above, when the number of pixels of the telephoto-side image data cropped out as a telephoto-side image is large in the imaging apparatus 10, the telephoto-side image can be generated in an advantageous state in terms of the processing load of the image processing circuit 302 and the performance of the imaging apparatus 10 by changing the drive mode of the image sensor 100. However, when the case in which the number of pixels of the telephoto-side image data cropped out as a telephoto-side image is the same as or smaller than the number of pixels of the moving image data of the telephoto side generated by the imaging apparatus 10 is considered, there is a possibility of dissatisfactory image quality when the drive mode of the image sensor 100 is changed to the pixel addition mode. For this reason, with regard to the imaging apparatus 10 according to the present embodiment, although the example in which the drive mode of the image sensor 10 is changed to the pixel addition mode when the number of pixels of the telephoto-side image data cropped out as a telephoto-side image is greater than the number of pixels of the moving image data of the telephoto side generated by the imaging apparatus 10 has been described, it is desirable to decide a threshold value of the number of pixels of the telephoto-side image data in order to determine the change of the drive mode of the image sensor 100 in consideration of a processing load, performance, and image quality. Thus, the imaging apparatus 10 is not limited only to have the constitution of applying the criterion of determination described above thereto, and when the number of pixels of the telephoto-side image data cropped out as a telephoto-side image is equal to or higher than the predetermined number of pixels, for example, the drive mode of the image sensor 100 may be determined to be changed to the pixel addition mode.

In the above description, the process performed during the generation of a telephoto-side image has been mainly described. In other words, description has been provided that in the process performed during the generation of the telephoto-side image data, the telephoto-side image data is generated by changing the drive mode of the image sensor 100 when the number of pixels of the telephoto-side image data cropped out as a telephoto-side image is large, and in the process performed during the generation of the wide-side image, the wide-side image data having 2 megapixels is generated merely from the horizontal-vertical resizing process on the pre-processed image data by the first transfer unit 202. However, as understood from the comparison of (b) of FIG. 3 and (b) of FIG. 5A, if the drive mode of the image sensor 100 is changed in order to generate the telephoto-side image data, the numbers of pixels of input image data output from the image sensor 100 are different. For this reason, when the entire resizing process performed in order to generate the wide-side image data is considered processing methods are different.

To be more specific, when the image sensor 100 is driven in the still mode, the pre-processed image data having 18 megapixels that is obtained by performing the pre-processing on the input image data having 18 megapixels undergoes the horizontal-vertical resizing process, and then is changed to the wide-side image data having 2 megapixels. On the other hand, when the image sensor 100 is driven in the pixel addition mode, pixel addition is performed in the image sensor 100 to change the input image data to the input image data having 4.5 megapixels, and the pre-processed image data having 4.5 megapixels obtained by performing the pre-processing on the changed input image data having 4.5 megapixels undergoes the horizontal-vertical resizing process, and then is changed to the wide-side image data having 2 megapixels. In other words, whereas the input image data is directly processed so as to be resized when the image sensor 100 is driven in the still mode, when the image sensor 100 is driven in the pixel addition mode, the number of pixels of the input image data is first reduced, and then the resizing process is performed.

Generally, it has been known that characteristics relating to image quality, for example, the resolution of an image, occurrence of a false color, and the like, are differently exhibited when the methods of the resizing process are different. For this reason, the imaging apparatus 10 is considered to exhibit different resolution of an image and occurrence of a false color in generated moving image data of the wide side according to the difference of the whole resizing processes. When only generated moving image data of the wide side is displayed, for example, a photographer (user) is highly likely to have a sense of discomfort.

Figure 6:
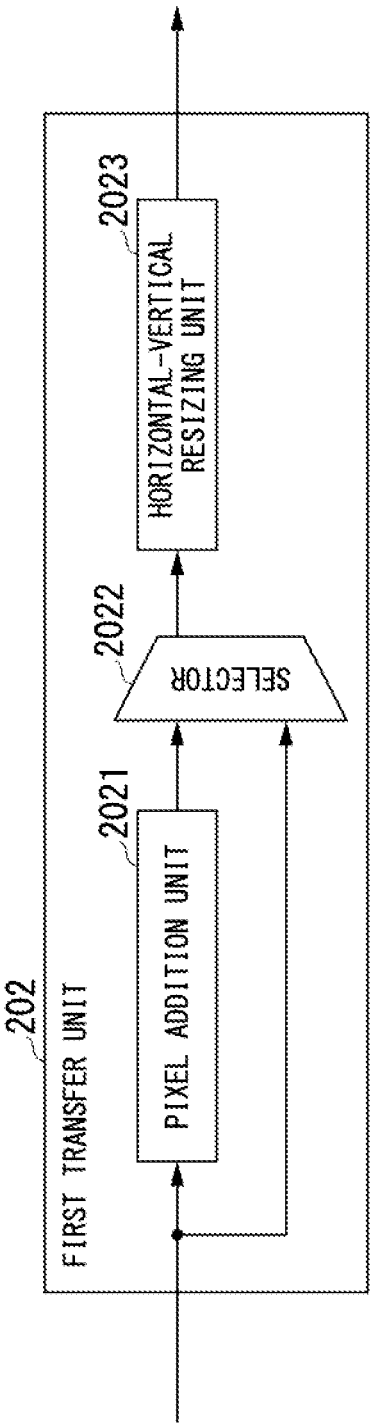
FIG. 6 is a block diagram illustrating a schematic constitution of a first transfer unit in an imaging IF unit included in the imaging apparatus of the embodiment.

The imaging apparatus 10 has a constitution in which the first transfer unit 202 in the imaging IF unit 200 performs the resizing process in the equal method even when the drive mode of the image sensor 100 is changed. FIG. 6 is a block diagram illustrating a schematic constitution of the first transfer unit 202 in the imaging IF unit 200 included in the imaging apparatus 10 of the present embodiment. The first transfer unit 202 illustrated in FIG. 6 includes a pixel addition unit 2021, a selector 2022, and a horizontal-vertical resizing unit 2023.

The pixel addition unit 2021 performs a process of reducing the number of pixels of pre-processed image data by performing the equal pixel addition to that performed by the image sensor 100 on the pre-processed image data input from the pre-processing unit 201, and then outputs pixel-added image data.

The selector 2022 selects either image data of the input image data input from the image sensor 100 or the pixel-added image data input from the pixel addition unit 2021 according to the drive mode of the image sensor 100, and then outputs the selected image data to the horizontal-vertical resizing unit 2023. To be more specific, the selector 2022 selects the pixel-added image data input from the pixel addition unit 2021 when the image sensor 100 is driven in the still mode, and selects the input image data input from the image sensor 100 when the image sensor 100 is driven in the pixel addition mode, and then outputs the image data to the horizontal-vertical resizing unit 2023. Accordingly, the image data that has undergone pixel addition by either the image sensor 100 or the pixel addition unit 2021 is input to the horizontal-vertical resizing unit 2023.

The horizontal-vertical resizing unit 2023 records (writes), on the DRAM 601, wide-side image data that is obtained by performing the horizontal-vertical resizing process on the input image data from the image sensor 100 or the pixel-added image data from the pixel addition unit 2021, both of which are input from the selector 2022.

With this configuration, the first transfer unit 207 can record (write) the wide-side image data that has been resized in the equal method on the DRAM 601 even when the drive modes of the image sensor 100 are different.

Figure 7B:
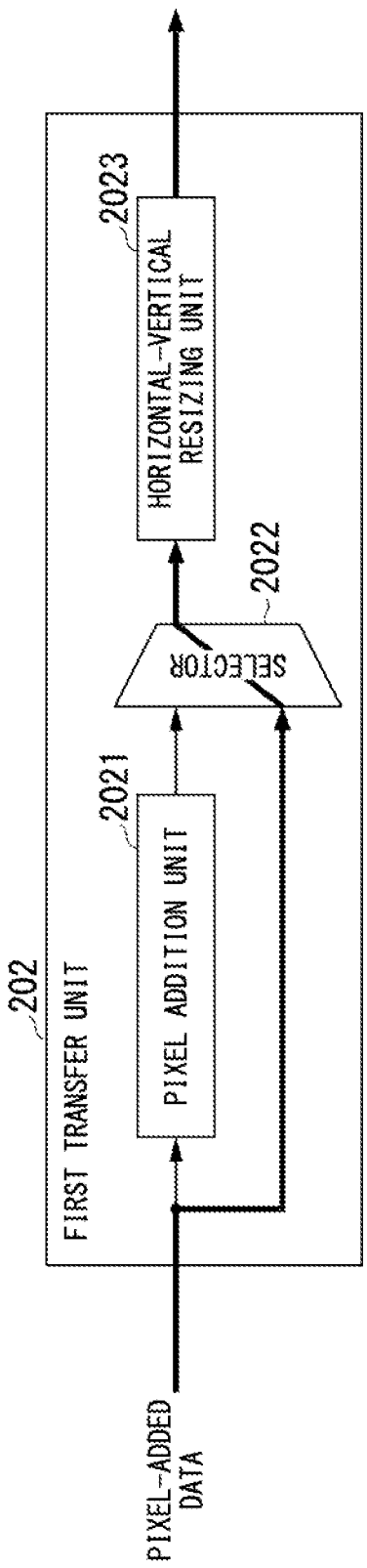
FIG. 7B is a diagram for describing another processing path of image data in the first transfer unit in the imaging IF unit included in the imaging apparatus of the embodiment.

Herein, processing paths of image data from input of the input image data to the first transfer unit 202 to the output of the wide-side image data will be described. FIGS. 7A and 7B are diagrams for describing processing paths of image data in the first transfer unit 202 in the imaging IF unit 200 included in the imaging apparatus 10 according to the present embodiment. FIG. 7A illustrates a processing path of image data when the image sensor 100 is driven in the still mode, in other words, when input image data that has not undergone pixel addition in the image sensor 100 is input. FIG. 7B illustrates a processing path of image data when the image sensor 100 is driven in the pixel addition mode, in other words, when input image data that has undergone pixel addition in the image sensor 100 is input.

First, the processing path of image data when the image sensor 100 is driven in the still mode will be described with reference to FIG. 7A. When the image sensor 100 is driven in the still mode, pre-processed image data (full data) corresponding to input image data of the entire region of the effective pixels is input from the image sensor 100 to the first transfer unit 202. In the first transfer unit 202, the pixel addition unit 2021 reduced the number of pixels of the full data by performing pixel addition on the input full data. Then, the selector 2022 selects the pixel-added frill data output from the pixel addition unit 2021, and then outputs the data to the horizontal-vertical resizing unit 2023. Then, the horizontal-vertical resizing unit 2023 performs the horizontal-vertical resizing process on the input pixel-added full data, and records (writes) wide-side image data of which the number of pixels has been changed in the foregoing process on the DRAM 601.

Next, a processing path of image data when the image sensor 100 is driven the pixel addition mode will be described with reference to FIG. 7B. When the image sensor 100 is driven in the pixel addition mode, pre-processed image data (pixel-added data) corresponding to input image data of which the number of pixels has been reduced in the image sensor 100 is input from the image sensor 100 to the first transfer unit 202. In the first transfer unit 202, pixel addition by the pixel addition unit 2021 on the input pixel-added data is not performed. Then, the selector 2022 selects the input pixel-added data, and outputs the data to the horizontal-vertical resizing unit 2023. Then, the horizontal-vertical resizing unit 2023 performs the horizontal-vertical resizing process on the input pixel-added data, and records (writes) wide-side image data of which the number of pixels has been changed in the foregoing process on the DRAM 601.

As described above, the first transfer unit 202 generates the wide-side image data on which the equal resizing process is performed regardless of the drive mode of the image sensor 100 by selecting image data that has undergone the horizontal-vertical resizing process by the horizontal-vertical resizing unit 2023 according to the drive mode of the image sensor 100.

Figure 8B:
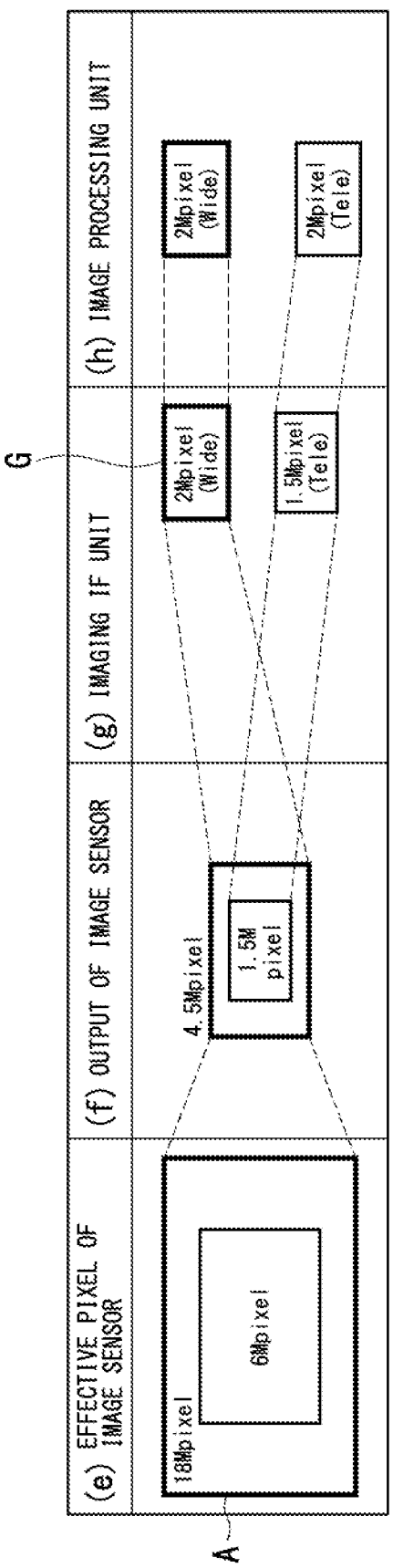
FIG. 8B is a diagram for describing still another example of the shifts of the number of pixels in each processing stage for generating images having different angles of view in the imaging apparatus according to the embodiment.
Figure 9A:
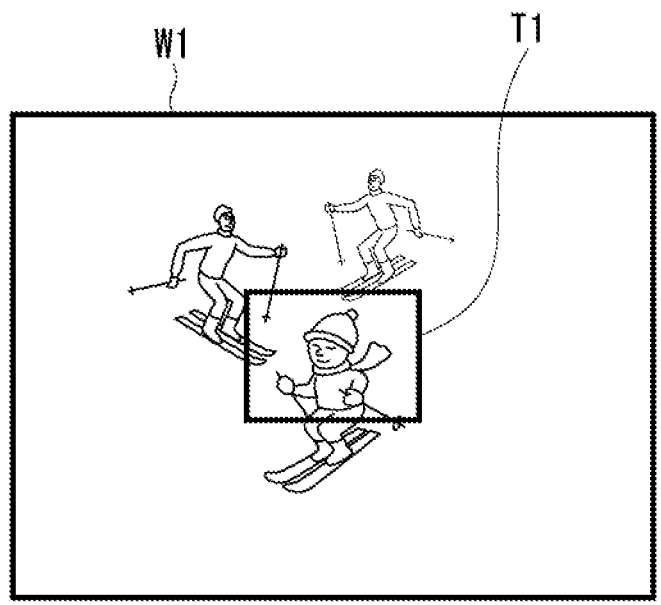
FIG. 9A is a diagram for describing an example of a size of a telephoto-side image cropped out from a wide-side image.
Figure 9B:
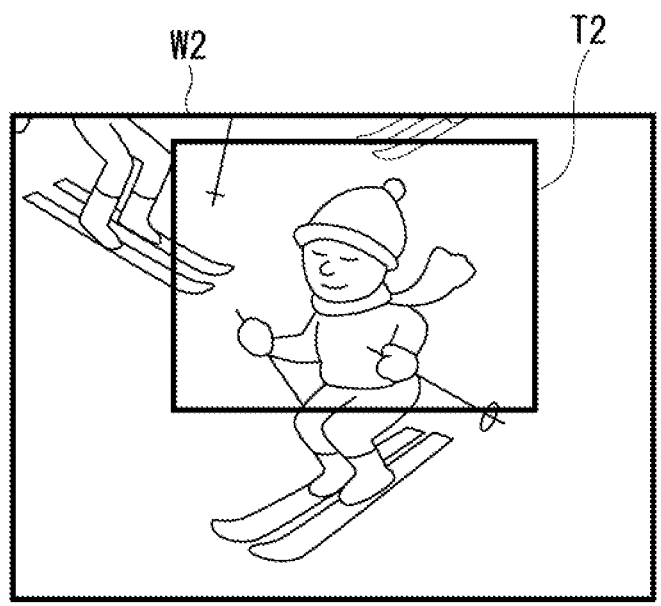
FIG. 9B is a diagram for describing an example of a size of a telephoto-side image cropped out from a wide-side image.

Herein, operations of each constituent element performed when the imaging apparatus 10 photographs a wide-side image and a telephoto-side image at the same time including the operation of the first transfer unit 202 will be described focusing on a size of an image processed by each constituent element, the number of pixels of image data to be processed. FIGS. 5A and 8B are diagrams for describing shifts of the number of pixels in each processing stage in which the imaging apparatus 10 according to the present embodiment generates images having different angles of view. FIGS. 8A and 8B illustrate an example in which the imaging apparatus 10 generates moving image data of a wide side and moving image data of a telephoto side, each of which has 2 million pixels (2 megapixels), from input image data of the image sensor 100 when the number of effective pixels of the image sensor 100 is 18 million pixels (18 megapixels).

First of all, shifts of the number of pixels of image data processed by each constituent element during the generation of the moving image data of the wide side by the imaging apparatus 10 when the number of pixels of telephoto-side image data cropped as a telephoto-side image is the same as the number of pixels (2 megapixels) of the moving image data of the telephoto side generated by the imaging apparatus 10 will be described.

In the generation of the moving image data of the wide side by the imaging apparatus 10, input image data (18 megapixels) of the region A corresponding to all of the effective pixels of the image sensor 100 illustrated in (a) of FIG. 8A is output to the imaging IF unit 200 by driving the image sensor 100 in the still mode (see (b) of FIG. 8A).

Then, the imaging IF unit 200 performs pre-processing on the input image data input (18 megapixels) from the image sensor 100 using the pre-processing unit 201, and then outputs the pre-processed image data (18 megapixels) to the first transfer unit 202. Then, in the first transfer unit 202, the pixel addition unit 2021 first performs pixel addition on the pre-processed image data to reduce the number of pixels to 4.5 megapixels as indicated by a region E in (c) of FIG. 8A. Then, the selector 2022 selects the pre-processed image data having 4.5 megapixels output from the pixel addition unit 7021, and then outputs the data to the horizontal-vertical resizing unit 2023. Then, the horizontal-vertical resizing unit 2023 performs the horizontal-vertical resizing process on the pre-processed image data (4.5 megapixels) of which the number of pixels has been reduced, and records (writes) wide-side image data of which the number of pixels has been changed in the foregoing process on the DRAM 601 as indicated by a region F in (c) of FIG. 8A. To be more specific, the pixel addition unit 2021 performs pixel addition in which the horizontal direction of the pre-processed image data, having 18 megapixels is reduced to ½ thereof and the vertical direction is reduced to ½ thereof, thereby reducing the number of pixels to 4.5 megapixels. Also in this case, the angle of view at which the image sensor 100 performs photographing does not change. The horizontal-vertical resizing unit 2023 performs the horizontal-vertical resizing process in which the horizontal direction of the pre-processed image data having 4.5 megapixels is reduced to 1/1.5 thereof and the vertical direction is reduced to 1/1.5 thereof, thereby changing the wide-side image data having 2 megapixels, and then records (writes) the data on the DRAM 601.

Then, in the image processing unit 300, the image processing circuit 301 performs the moving image compression process of the H.264 format on the wide-side image data having 2 megapixels that has undergone the horizontal-vertical resizing process by the first transfer unit 202 to generate moving image data of the wide side having 2 megapixels as illustrated in (d) of FIG. 8A, and then records (writes) the data on the DRAM 601 again.

Shifts of the number of pixels of image data processed by each constituent element during the generation of moving image data of the telephoto side by the imaging apparatus 10 will not be described since they are the same as those illustrated in FIG. 3. Shifts of the number of pixels of image data in each processing state when the number of pixels of telephoto-side image data cropped as a telephoto-side image is smaller than the number of pixels (2 megapixels) of moving image data of the telephoto side generated by the imaging apparatus 10, in other words, when a main subject appears small in a wide-side image, will not be described either since they are the same as those illustrated in (a) of FIG. 8A to (d) of FIG. 8A.

Next, shifts of the number of pixels of image data processed by each constituent element during generation of moving image data of the wide side by the imaging apparatus 10 when the number of pixels of the telephoto-side image data cropped as a telephoto-side image is greater than the number of pixels (2 megapixels) of the moving image data of the telephoto side generated by the imaging apparatus 10, in other words, when the main subject appears large in the wide-side image, will be described.

In the generation of the moving image data of the wide side by the imaging apparatus 10 when the main subject appears large in the wide-side image, when the input image data (18 megapixels) of the region A corresponding to all of the effective pixels of the image sensor 100 illustrated in (e) of FIG. 8B is output to the imaging IF unit 200, the image sensor 100 is driven in the pixel addition mode, and the input image data (4.5 megapixels) of which the number of pixels has been reduced in the pixel addition is output to the imaging IF unit 200 (see (g) of FIG. 8B). The region A of the image sensor 100 illustrated in (e) of FIG. 8B is the same as the region A of the image sensor 100 illustrated in (a) of FIG. 8A. The angle of view at which the image sensor 100 performs photographing does not change.

Then, the imaging IF unit 200 performs pre-processing on the input image data (4.5 megapixels) input from the image sensor 100 using the pre-processing unit 201, and then outputs the pre-processed image data (4.5 megapixels) to the first transfer unit 202. Then, in the first transfer unit 202, the selector 2022 selects the pre-processed image data having 4.5 megapixels input from the pre-processing unit 201, and then outputs the data to the horizontal-vertical resizing unit 2023. Then, the horizontal-vertical resizing unit 2023 performs the horizontal-vertical resizing process on the pre-processed image data (4.5 megapixels) input from the pre-processing unit 201, and records (writes) wide-side image data of which the number of pixels has been changed in the foregoing process as indicated by a region G in (g) of FIG. 8B on the DRAM 601. To be more specific, the horizontal-vertical resizing unit 2023 performs the horizontal-vertical resizing process in which the horizontal direction of the pre-processed image data having 4.5 megapixels is reduced to 1/1.5 thereof and the vertical direction is reduced to 1/1.5 thereof, thereby changing the data to the wide-side image data having 2 megapixels, and then records (writes) the data on the DRAM 601.

Then, in the image processing unit 300, the image processing circuit 301 performs the moving image compression process of the H.264 format on the wide-side image data having 2 megapixels that has undergone the horizontal-vertical resizing process by the first transfer unit 202 to generate moving image data of the wide side having 2 megapixels as illustrated in (h) of FIG. 8B, and the records (writes) the data on the DRAM 601 again.

The generation of the moving image data of the telephoto side when the main subject appears large in the wide-side image illustrated in (e) of FIG. 8B to (h) of FIG. 8B exhibits the same shifts as those illustrated in (a) of FIG. 5A to (d) of FIG. 5A since the selector 2022 in the first transfer unit 202 selects the pre-processed image data having 4.5 megapixels input from the pre-processing unit 201.

Since the shift of the number of pixels of image data processed by each constituent element during the generation of moving image data of the telephoto side by the imaging apparatus 10 when the main subject appears large in the wide-side image is the same as that illustrated in (a) of FIG. 5A to (d) of FIG. 5A, description thereof will be omitted.

As described above, in the imaging apparatus 10, either of the image sensor 100 or the pixel addition unit 2021 of the first transfer unit 202 performs pixel addition to reduce the number of pixels, and the horizontal-vertical resizing unit 2023 performs the horizontal-vertical resizing process on the image data after the pixel addition, and wide-side image data is thereby generated. Accordingly, the imaging apparatus 10 can generate the wide-side image data that has undergone the equal resizing process regardless of the drive mode of the image sensor 100. Accordingly, the imaging apparatus 10 can reduce a difference in characteristics relating to image quality such as resolution of an image or an occurring false color caused by a change in the drive mode of the image sensor 100, and thereby can generate moving image data of the wide side that is less likely to give discomfort to a photographer (user).

As described above, when a wide-side image and a telephoto-side image are photographed at the same time in the imaging apparatus 10 according to the present embodiment, the drive mode of the image sensor 100 to read input image data is changed according to the size of a main subject taken in the wide-side image. To be more specific, when the main subject appears large in the wide-side image, the drive mode of the image sensor 100 is changed from the still mode to the pixel addition mode. With regard to this matter, in an imaging apparatus of the related art, depending on the size of a main subject, particularly, when the main subject appears large in a wide-side image, although the number of pixels of a telephoto-side image that is cropped out from the wide-side image and subject to image processing increases, and a load of transfer of image data and the image processing accordingly increases, in the imaging apparatus 10 according to the present embodiment, even when a main subject appears large in a wide-side image, an increase in the number of pixels of the telephoto-side image that is cropped out from the wide-side image and subject to image processing can be suppressed, and a load of transfer of image data and the image processing can be reduced. Accordingly, in the imaging apparatus 10 according to the present embodiment, a wide-side image and a telephoto-side image can be photographed at the same time without lengthening a time required for image processing.

In the imaging apparatus 10 according to the present embodiment, the pixel addition unit 2021 that performs the equal pixel addition as that performed by the image sensor 100 is provided in the first transfer unit 202 that generates wide-side image data used in the generation of a wide-side image, and the method of the resizing process performed in order to generate the wide-side image data is switched according to the drive mode of the image sensor 100. Accordingly, in the imaging apparatus 10 according to the present embodiment, the wide-side image data that has undergone the equal resizing process can be generated regardless of the drive mode of the image sensor 100 that is changed based on a telephoto-side image that is cropped out from the wide-side image and subject to image processing. In other words, the wide-side image data, used to generate the wide-side image can be generated without being affected by the telephoto-side image that is cropped out from the wide-side image and subject to image processing.

As described above, according to an embodiment for implementing the present invention, when a plurality of images having different angles of view (in the embodiment, two images of a wide-side image and a telephoto-side image) are photographed at the same time, an optical image of a subject is formed on an image sensor in a state in which a zoom lens is set to be on a wide angle side (wide side). In addition, according to the embodiment for implementing the present invention, a drive mode of the image sensor for reading a pixel signal according to subject light of which an image is formed on the image sensor is changed according to the size of a main subject photographed as an image on the wide angle side (wide side). Accordingly, in the embodiment for implementing the present invention, it is possible to avoid an increase in the number of pixels of image data cropped in order to generate an image on the telephoto side and an increase in a load of transfer of the image data or image processing particularly when the main subject appears large in an image formed on the wide side. Accordingly, in the embodiment for implementing the present invention, a plurality of images having different angles of view can be photographed at the same time regardless of the size of the main subject taken in an image on the wide side without lengthening a time required for image processing performed in order to generate an image on the telephoto side. Accordingly, even when a subject making active motions in example, a footrace in athletics or an auto race such as F1 (Formula One) is photographed, a photographer (user) can photograph a subject without losing sight of it, and can obtain an image in which the subject appears large. In the embodiment for implementing the present invention, it is possible to suppress deterioration of performance such as a shortened interval of consecutive photographing, a frame drop in moving image photogaphing, or an increase in power consumption caused by an increase in a load of transfer of image data or a load of image processing.

According to the embodiment for implementing the present invention, the function of performing the equal process to the resizing process performed by the image sensor is provided in a constituent element that generates image data, used when an image on the wide side is generated. Accordingly, the embodiment for implementing the present invention, according to a drive mode of the image sensor that is changed based on an image on the telephoto side that is cropped out from an image on the wide side and subject to image processing, the method of the resizing process performed in order to generate image data used in the generation of the image on the wide side can be switched, and the equal resizing process can be performed regardless of a drive mode of the image sensor. Accordingly, in the embodiment for implementing the present invention, it is possible to equalize characteristics relating to image quality such as resolution of an image generated on the wide side, or an occurring false color, and thereby to generate an image on the wide side that is less likely to give discomfort to a photographer (user).

The number of effective pixels of the image sensor 100, the number of pixels and a resizing ratio of the moving image data on the wide side and the moving image data on the telephoto side generated by the first transfer unit 202 and the second transfer unit 203 of the imaging IF unit 200, and the number of pixels of the moving image data on the wide side and the moving image data on the telephoto side generated by the image processing unit 300 are only examples, and the principle of the present invention can be applied to any number of pixels or resizing ratio in the same manner as above as long as the application is performed within the scope not departing from the gist of the present invention. The position of the region on the wide side (for example, all of the effective pixels of the image sensor 100) and the region on the telephoto side (for example, the center portion) described in the present embodiment are likewise only examples, and the principle of the present invention can be applied any region or position in the same manner as above as long as the application is performed within the scope not departing from the gist of the present invention.

In the present embodiment, the case in which the image sensor 100 performs pixel addition to reduce the number of pixels of input image data has been described, however, the method for reducing the number of pixels of the input image data output by the image sensor 100 is not limited only to the constitution shown in the embodiment for implementing the present invention. The principle of the present invention can be applied also to a case, for example, in which the image sensor 100 has a drive mode in which pixel signals are added or thinned out for each line and then output. In this case, instead of the pixel addition unit 2021, a constituent element that performs the equal process to a process performed in the drive mode in which the image sensor 100 adds or thins out pixel signals for each line and then outputs them is provided in the first transfer unit 202.

In the present embodiment, the case in which two moving images having different angles of view are photographed at the same time has been described, however, a case in which the imaging apparatus photographs two still images having different angles of view at the same time can be considered in the same manner as above except that the number of pixels in each process step are different. In the imaging apparatus 10, for example, by setting each of the numbers of pixels of wide-side image data and telephoto-side image data respectively output by the first transfer unit 202 and the second transfer unit 203 of the imaging IF unit 200 and the numbers of pixels of a wide-side image and a telephoto-side image for display and a wide-side image and a telephoto-side image for recording each of which undergoes image processing for still images and is output by the image processing circuit 301 and the image processing circuit 302 of the image processing unit 300 to be the number of pixels corresponding to a still image, the operation can be considered in the same manner as when the moving images are photographed as described above. The principle of the first transfer unit 202 may be applied not only to a case in which a plurality of moving images or still images are photographed but also to a case in which one moving image or still image is photographed.

In the present embodiment, the constitution in which two image processing circuits (the image processing circuits 301 and 302) are provided in the image processing unit 300 included in the imaging apparatus and each of the image processing circuits performs image processing on wide-side image data or telephoto-side image data has been described. However, a constitution or the number of image processing circuits provided in the image processing unit 300 is not limited only to the constitution shown in the embodiment for implementing the present invention. For example, a constitution which one image processing circuit is provided in the image processing unit 300 to generate image data for display and image data for recording corresponding to each of wide-side image data and telephoto-side image data by performing image processing thereon in a time dividing manner may be possible.

In the present embodiment, the constitution in which the subject detection unit 800 is provided in the imaging apparatus and the subject detection unit 800 detects a position and size of a photographed main subject, and each of the first transfer unit and the second transfer unit (particularly the second transfer unit 203) changes to an appropriate degree of angle of view in an appropriate position using the information on the position and size of the main subject detected by the subject detection unit 800 has been described. However, a constitution of each of the first transfer unit and the second transfer unit (Particularly, the second transfer unit 203) for changing an angle of view is not limited to the constitution in the embodiment for implementing the present invention. When the display device 401 is a touch panel, for example, a constitution in which a photographer (user) designates an angle of view of a telephoto-side image cropped out from a wide-side image in the state in which the wide-side image is being displayed on the display device 401 may be possible.

The principle of the present invention can be applied in the same manner also to a case in which the horizontal direction and the vertical direction defined in the present embodiment are inversely considered.

While the preferred embodiment of the invention has been described and illustrated above, it should be understood that it is exemplary of the invention and is not to be considered as limiting. Additions, omissions, substitutions, and other modifications can be made without departing from the scope of the present invention. Accordingly, the invention is not to be considered as being limited by the foregoing description, is only limited by the scope of the appended claims.

What is claimed is:

1. The imaging apparatus comprising:
   a solid-state image sensor that has a plurality of pixels arranged in a two-dimensional matrix form and outputs pixel signals according to subject light incident on each of the plurality of pixels in at least two or more drive modes;
   a first processing unit that performs, on the pixel signals output by the solid-state image sensor according to any one drive mode, an equal process to a first process performed when the solid-state image sensor outputs the pixel signals according to another drive mode;
   a pixel signal selection unit that selects any one of the pixel signals that are subject to the equal process to the first process performed by the first processing unit or the pixel signals that are subject to the first process performed by the solid-state image sensor according to the latter drive mode; and
   a second processing unit that performs a second process on the pixel signals selected by the pixel signal selection unit,
   wherein the first process is a process of reducing the pixel signals to be output by adding or thinning out each of the pixel signals output from each of the pixels that the solid-state image sensor has by a predetermined number for each of the pixel signals, and
   wherein the second process is a process of resizing the region of the pixels that are arranged in the solid-state image sensor expressed by the pixel signals that have undergone the first process to a region having predetermined sizes in the row direction and in the column direction.

2. The imaging apparatus according to claim 1, further comprising:
   a first conversion unit that has the first processing unit, the pixel signal selection unit, and the second processing unit, performs a first conversion process on pixel signals output from pixels arranged in a predetermined first pixel region in the region of all of the pixels arranged in the solid-state image sensor so as to convert the first pixel region of the size into a region of a predetermined size, and outputs first image data as a result of performing the first conversion process;
   a second conversion unit that performs a second conversion process on pixel signals output from pixels arranged in a predetermined second pixel region which is smaller than the first pixel region in the region of all of the pixels arranged in the solid-state image sensor so as to convert the second pixel region of the size into a region of a predetermined size, and outputs second image data as a result of performing the second conversion process; and a drive mode change unit that changes a drive mode of the solid-state image sensor according to the size of the second pixel region before the conversion.

3. The imaging apparatus according to claim 2, wherein the second pixel region is decided based on the size of a main subject included in the first pixel region, and wherein the drive mode change unit causes the solid-state image sensor to be driven in a first drive mode in which the pixel signals of all of the pixels that the solid-state image sensor has are output when the number of pixels included in the second pixel region is smaller than a predetermined threshold value, and causes the solid-state image sensor to be driven in a second drive mode in which the pixel signals of which the number of the signals is smaller than the number of pixel signals output in the first drive mode are output by performing the first process when the number of pixels included in the second pixel region is equal to or greater than the threshold value.

4. The imaging apparatus according to claim 3, wherein the pixel signal selection unit selects the pixel signals obtained by performing the equal process to the first process by the first processing unit on the pixel signals output from the solid-state image sensor according to the first drive mode when the solid-state image sensor is driven in the first drive mode, and selects the pixel signals output from the solid-state image sensor by performing the first process according to the second drive mode when the solid-state image sensor is driven in the second drive mode.

5. The imaging apparatus according to claim 4, wherein the first conversion process is performed to resize the region of the pixels arranged in the solid-state image sensor corresponding to the size of the first pixel region to a region having predetermined sizes in the row direction and in the column direction through the first process and the second process.

6. The imaging apparatus according to claim 5, wherein the second conversion process is a process of cropping out the region of the pixels arranged in the solid-state image sensor corresponding to the size of the second pixel region from the region of the pixels arranged in the solid-state image sensor corresponding to the size of the first pixel region.

* * * * *